Feb. 17, 1948.   C. T. McGILL   2,435,975
FLUID CONDITIONING TANK CONTAINING CONDITIONING MATERIAL
AND A RECEPTACLE THEREWITHIN CONTAINING
DIFFERENT CONDITIONING MATERIAL
Filed Dec. 7, 1942   4 Sheets-Sheet 1
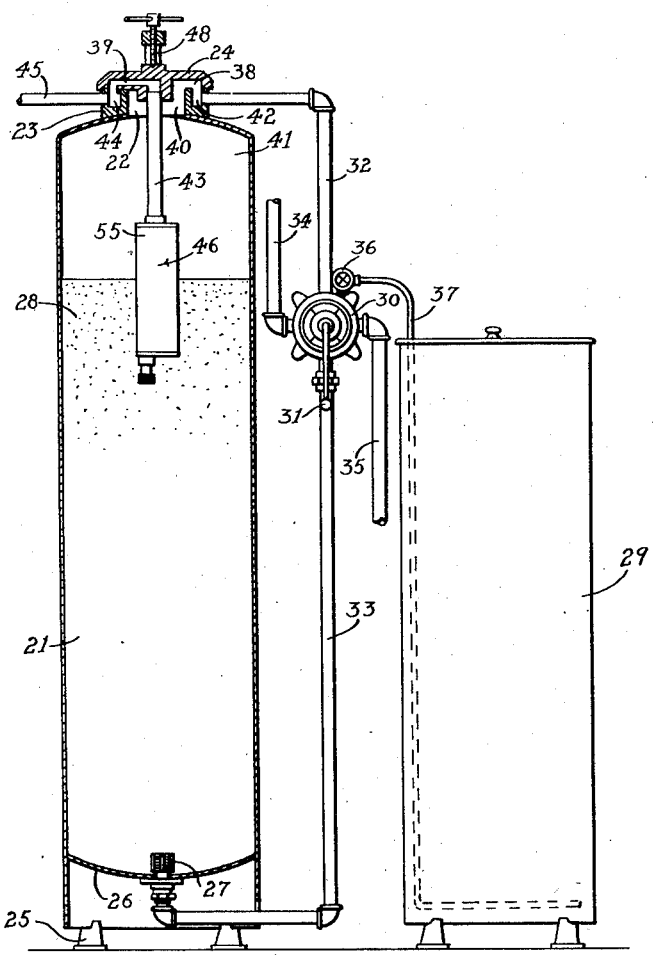
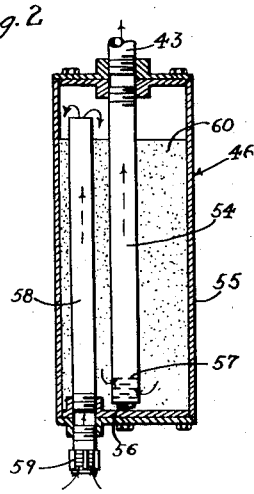
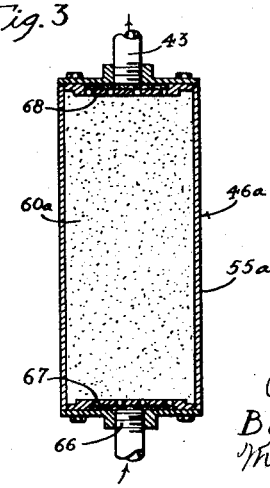
Inventor:
Chester T. McGill
By
McCanna, Wintercorn & Mowbach
Attys.

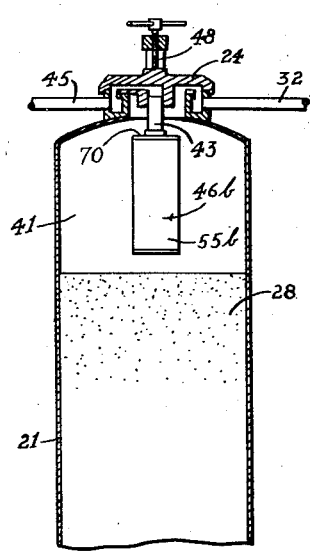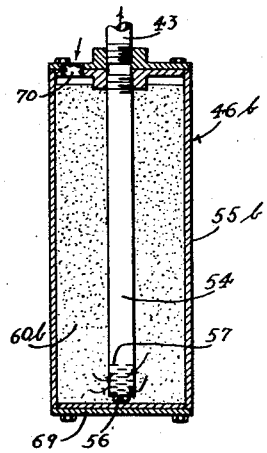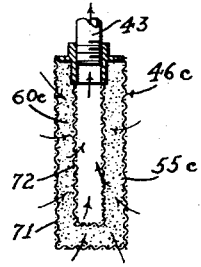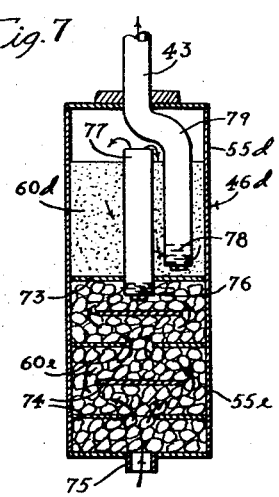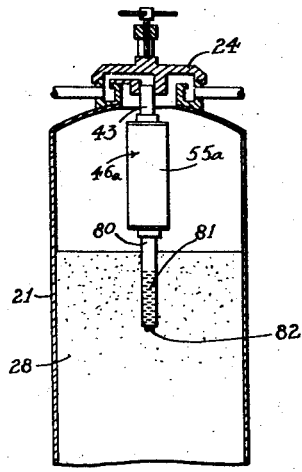

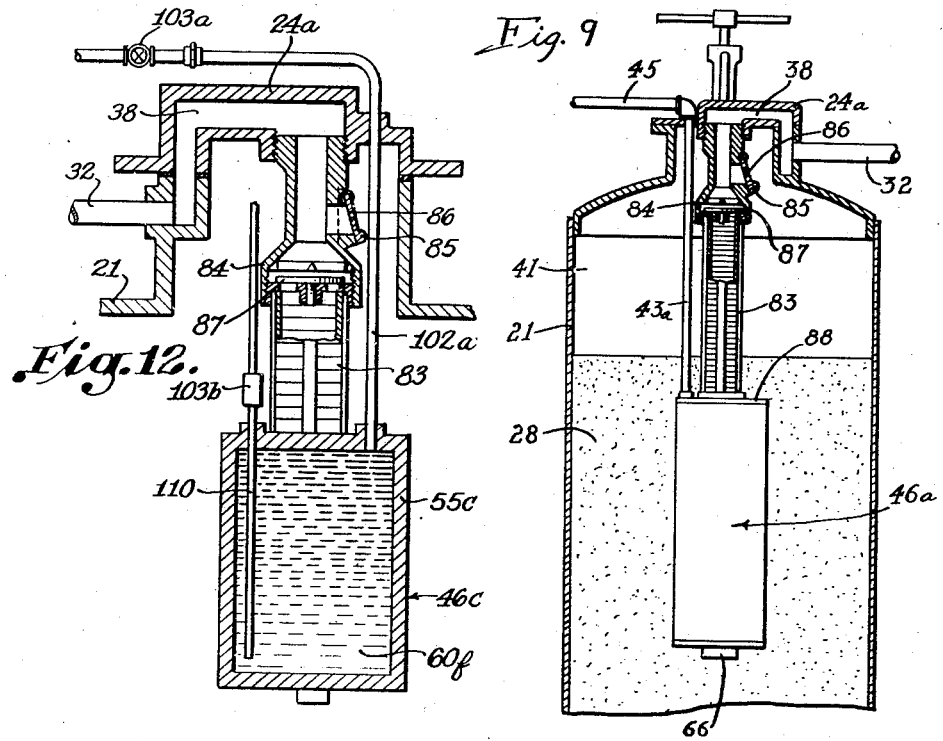

Feb. 17, 1948.  C. T. McGILL  2,435,975
FLUID CONDITIONING TANK CONTAINING CONDITIONING MATERIAL
AND A RECEPTACLE THEREWITHIN CONTAINING
DIFFERENT CONDITIONING MATERIAL
Filed Dec. 7, 1942  4 Sheets-Sheet 4
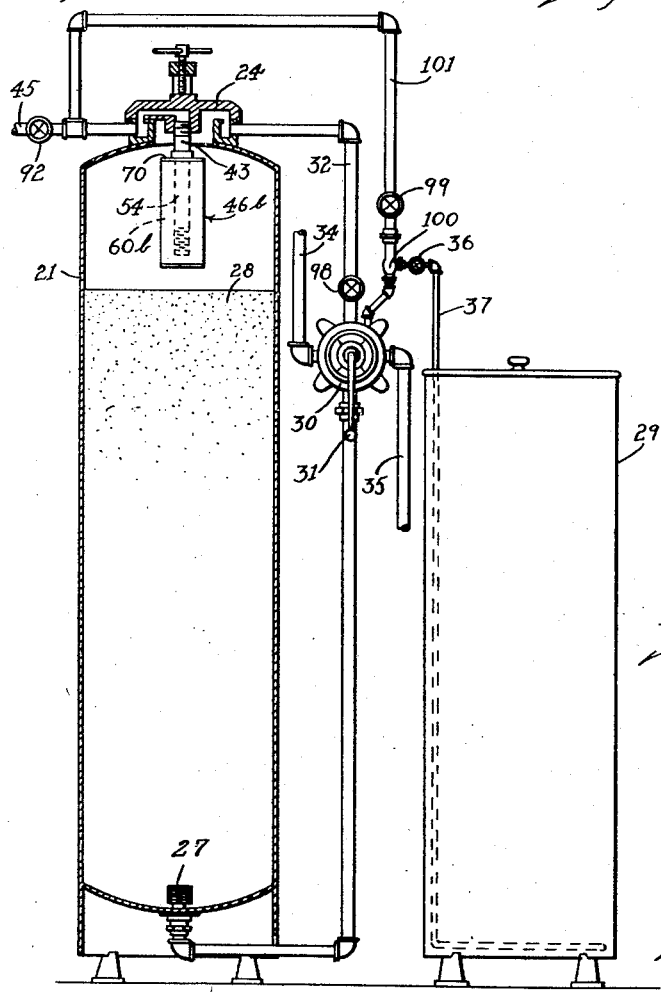
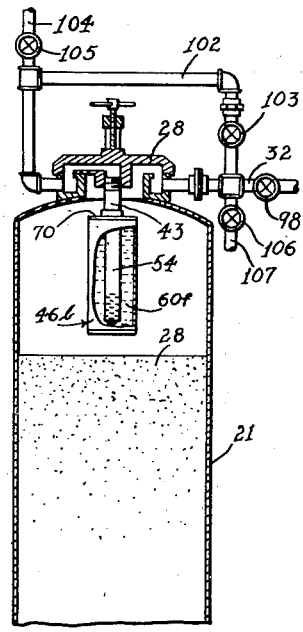
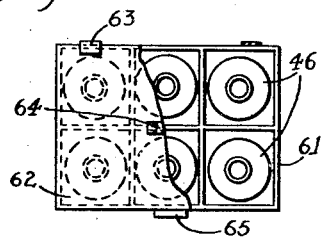
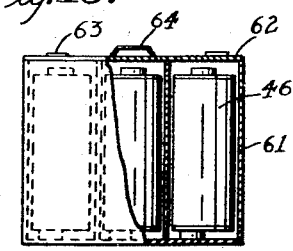
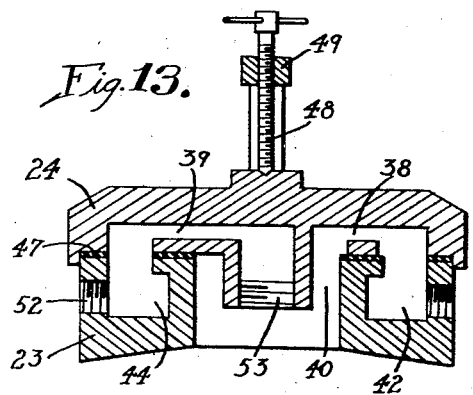
Inventor:
Chester T. McGill
By
McCanna, Wintercorn & Morsbach
Attys.

Patented Feb. 17, 1948

2,435,975

UNITED STATES PATENT OFFICE 2,435,975

FLUID CONDITIONING TANK CONTAINING CONDITIONING MATERIAL AND A RECEPTACLE THEREWITHIN CONTAINING DIFFERENT CONDITIONING MATERIAL

Chester T. McGill, Elgin, Ill.

Application December 7, 1942, Serial No. 468,071

5 Claims. (Cl. 210—24)

This application is a continuation in part of my copending application Serial No. 274,705, filed May 20, 1939, which resulted in patent 2,304,109, issued December 8, 1942.

This invention relates to fluid conditioning apparatus, and is more particularly concerned with means operating in conjunction with such fluid conditioning apparatus for supplementary treatment of the fluid.

One of the principal objects of my invention is to provide supplementary treatment means installable or attachable as a separate unit in or on a fluid conditioning apparatus, the unit containing activated carbon, calgon, corexite, iron removing mineral, chlorine pellets, alum, iron coagulant, or any other fluid conditioning material, depending upon the needs of each particular installation, the unit in certain instances containing more than one of these materials, where more than one kind of treatment is required.

A salient feature of the invention consists in the provision of a number of the fluid treatment units for a given fluid conditioning apparatus, the units being quickly and easily detachable and replaceable, so that a fresh unit may be substituted from time to time for an exhausted unit, and the exhausted units may be refilled or reconditioned without interrupting the operation of the fluid conditioning apparatus.

Another object of the invention is to provide fluid treatment means for a fluid conditioning apparatus, whereby to provide for simultaneous discharge from such an apparatus of fluids treated in different ways, that is to say, in a water softening unit a portion of the water may be merely softened suitable for bath and laundry purposes and the remainder, with or without being softened, more or less as the condition of the incoming water may dictate, may be treated so as to be particularly wholesome drinking water.

Another object of this invention is to provide a fluid treatment unit easily installable in the upper end of the tank of a fluid conditioning apparatus suspended from a cover cap, this arrangement having the two-fold advantage that the unit operates with equalized pressure inside and outside the same, and, hence, may be a light and inexpensive construction, and that the unit may be quickly and easily removed and replaced.

A further object of the invention is to provide a fluid treatment unit for operation in conjunction with a fluid conditioning apparatus of the type adapted to be reconditioned or regenerated with brine, or the like, the fluid treatment unit being so connected with the fluid conditioning apparatus to permit passage of the reconditioning agent through the fluid treatment unit at the time of regeneration of the fluid conditioning apparatus, so as to clean or otherwise recondition the contents of the fluid treatment unit.

Still another object of the invention is to provide a fluid treatment unit for operation in conjunction with a fluid conditioning apparatus, wherein the fluid treatment unit is also connected and arranged to operate as a proportional chemical feeder, discharging supplemental fluid conditioning material into the fluid being conditioned in the fluid conditioning apparatus, such chemical being supplied in a predetermined proportion to the volume of water passed through the apparatus.

Other objects and advantages of the invention will appear from the following description, in which reference is made to the accompanying drawings, wherein—

Fig. 1 is a view, partly in vertical section and partly in side elevation, of a fluid conditioning apparatus equipped with a fluid treatment unit in accordance with my invention;

Fig. 2 is an enlarged sectional view of the fluid treatment unit shown in Fig. 1;

Fig. 3 is a similar view of a modified form of treatment unit, adapted for use in the same way as that shown in Fig. 2;

Fig. 4 is a view similar to Fig. 1, but showing only the upper portion of the main tank, illustrating a different form of water treatment unit;

Fig. 5 is an enlarged sectional view of the water treatment unit shown in Fig. 4;

Figs. 6 and 7 are sectional views of other forms of water treatment units;

Figs. 8 and 9 are views similar to Fig. 4 showing still other forms of water treatment units;

Fig. 10 is a view similar to Fig. 1, showing another embodiment of the invention, with the water treatment unit inside the main tank, providing for cleaning or reconditioning of the unit by the brine used in the regeneration of the water conditioning apparatus;

Fig. 11 is a view similar to Fig. 1, but showing still another embodiment of the invention, in which the water treatment unit acts as a proportional chemical feeder, only the upper portion of the main tank being shown;

Fig. 12 is a fragmentary view showing another embodiment of the invention along similar lines;

Fig. 13 is an enlarged sectional detail of the form of closure cap shown in the various embodiments of my invention, with the exception of Figs. 9 and 12, and Figs. 14 and 15 are two views of a storage and carrying case for water treatment units.

Similar reference numerals are applied to corresponding parts throughout the views.

Referring first mainly to Fig. 1, in the various embodiments of my invention, the fluid conditioning apparatus is illustrated as comprising a main tank 21, having a top opening 22, surrounded by an upwardly projecting neck 23, on which a removable cap 24 is fitted. The tank is supported on feet 25, and has a bottom 26 through the center of which projects a pipe connection equipped with a strainer 27. To save space, in some views only the upper portion of the tank 21 is shown. To simplify matters, in the following description it will be assumed that the fluid to be conditioned is water, and that the material 28 in the tank 21 is zeolite or other base exchange water softening material, and that the smaller tank 29 contains salt brine for the regeneration of the material 28 in the usual way. However, it should be understood that the invention is not limited to water softeners, but is applicable to other fluids and fluid conditioning apparatus. In each of the embodiments it will be understood that a multi-port valve 30 is provided, whether illustrated or not, shiftable manually from one position to another by means of the handle 31 to control the operation of the fluid conditioning apparatus. The raw hard water is supplied to the back of the valve 30 through a pipe (not shown), and during softening operation the incoming raw water is directed in the valve upwardly through the pipe 32 for passage downwardly through the bed of water softening material, and the softened water is discharged through the strainer 27 and conducted through pipe 33 back to the valve and directed in the valve to the pipe 34 connected to the service system. In an upflow softener, the water is directed downwardly from the valve and into the bottom of the tank, and the softened water is discharged from the top of the tank and directed in the valve to the service system. In most embodiments of the invention, as will soon appear, it is immaterial whether the softener operates on the upflow or downflow principle. Assuming downflow operation, however, the raw water during backwash is directed into the bottom of the tank after the valve 30 has been shifted to the backwash position, and the silt laden water discharged from the top of the tank through the pipe 32 is directed in the valve 30 to the drain pipe 35 leading to the sewer or other waste receptacle. After the backwash, the valve 30 is shifted to brining position and a small valve 36 is opened to permit drawing brine from the brine tank 29 through a small pipe 37 which extends down in the tank 29 to the bottom thereof. The valve 30 has an ejector nozzle therein through which water is discharged so as to entrain brine with it, the diluted brine being conducted to the tank 21 for passage through the bed of water softening material 28 in the usual way, and the spent brine discharged from the tank being conducted through the drain pipe 35 to the sewer or other waste receptacle. After a predetermined amount of brine has been passed through the bed, the valve 36 is closed and the raw water alone is passed through the bed to rinse out the brine and released calcium and magnesium, the rinse water being discharged through the drain pipe 35. When the outgoing rinse water tests soft, the valve 30 is shifted back to the softening position to resume softening operation.

In accordance with my invention, the cap 24 has two passages therein, numbered 38 and 39, the passage 38 opening at its inner end 40 into the head space 41 in the tank and at its other end into a chamber 42 in the neck 23 with which the pipe 32 communicates, whereby to direct the flow between the head space in the tank and the pipe 32 in either direction through the passage 38 in the cap 24. The passage 39 communicates at its inner end with a pipe 43 threaded in an opening in the center of the cap, and communicates at its outer end with a chamber 44 in the neck 23 with which a pipe 45 is connected, whereby to establish a second flow of specially treated water from the water treatment unit 46, as, for example, filtered water for drinking purposes, this water being conducted through the pipe 45 to the point or points of use. The unit 46 is suspended from the cap 24 and partially submerged in the upper portion of the bed 28, as first disclosed in the copending application mentioned above, of which this application is a continuation in part. The cap can be turned through 180° to reverse the system of communication described. The construction of the cap 24 is better shown in Fig. 13. A gasket 47 ported to communicate with the ports in the cap 24 and neck 23 is compressed between the neck and cap by the tightening of a screw 48 in a U-shaped yoke 49, on which are jaws to engage under projections provided on diametrically opposite sides of the neck 23. With this construction, when a softener is sold without a water treatment unit the same cap 24 may be provided, and either or both of the holes 52 and 53 may be closed with a removable screw-threaded plug, so that if the purchaser desires later to add the water treatment unit it will be a simple matter to install it. In many localities softened water, although entirely suitable for bath and laundry purposes, is not desirable for drinking, due to odor, taste, discoloration, or other objections, which a water treatment unit like that illustrated at 46 in Fig. 1 is constructed to eliminate so as to produce wholesome drinking water.

The unit 46, as disclosed in Fig. 2, has a pipe 54 communicating with the lower end of the pipe 43 and projecting downwardly to a point near the bottom of the shell or container 55, where it is closed by a plug 56 and has a number of slots 57. Another pipe 58 extends from the bottom of the container upwardly to a point near the upper end, and communicates at its lower end with a strainer 59 below the bottom of the container 55. The container 55 is partially submerged in the upper portion of the bed 28 and is nearly filled with a fluid treatment material 60, such as activated carbon, calgon, corexite, iron removing mineral, chlorine pellets, alum, iron coagulant, or any other water treatment material depending upon the kind of water and the kind of treatment or treatments desired. In operation, during normal softening operation, a certain amount of the raw water entering the top of the tank 21 and passing downwardly through the bed 28 is conducted through the slots in the strainer 59 and flows upwardly through the pipe 58 for passage downwardly through the bed 60 of water treating material, and is collected through slots 57 for passage upwardly through the pipe 54 and pipe 43 and through the passage 39 in the cap 24 for discharge through the pipe 45. The raw water in passing through the upper portion of the bed 28 will be softened to a degree depending upon how far the container 55 is submerged in the bed 28. This partially softened water is then subjected to whatever supplemental treatment is obtainable by passage through the bed 60 of water treating material, such supplemental treatment being, of course, dependent on the kind of material in the container 55. In a softener operating on the upflow principle, the water delivered to the unit 46 for supplemental treatment will, of course, be softened. If the water discharged through pipe 45 is intended for drinking, the material 60 could be an odor and/or taste removing material, or could be a material adapted only to properly chlorinate the drinking water. It should be apparent that the operation of the water treatment unit in no way interferes with the otherwise normal operation of the softener, but the installation of the water treatment unit makes wholesome drinking water available in the desired amount without inconvenience and at very low cost. Location of the unit 46 inside the tank 21 is of advantage because the pressures inside and outside the container 55 are equalized and the container can, therefore, be of light and inexpensive construction and does not have to be entirely watertight.

In accordance with my invention, as disclosed in Figs. 14 and 15, six units like that shown at 46 may be provided for a single installation to insure an all year around supply of wholesome drinking water, a storage and carrying case 61 being provided, having six compartments for these six units. A cover 62 hinged to the case, as at 63, and equipped with a handle 64 and a suitable lock 65 contains the used and unused units, an exhausted unit being removed from the apparatus and replaced with an unused unit at regular intervals, or whenever a test of the drinking water indicates the necessity for replacement of the unit then in use. In that way the user may have the exhausted units refilled or reconditioned while another unit is still in use and there will, therefore, be no interruption of service. The cap 24 can be removed easily to permit withdrawal and removal of the unit 46 and attachment of another unit.

In the modified form of unit 46a shown in Fig. 3, the container 55a has an opening 66 in the bottom thereof for inlet of water through a screen 67 and passage upwardly through the water treating material 60a. Another screen 68 in the upper end of the container serves to retain the material in the discharge of treated water through pipe 43 to the service pipe 45. The operation with this water treatment unit installed in the same way as the unit 46 in Fig. 1 is substantially the same and the same advantages are derived.

Referring now to Figs. 4 and 5, the water treatment unit 46b is shown connected to a pipe 43 in the same manner as the unit 46, but disposed wholly above the bed 28 in the head space 41. Assuming downflow operation, it will be apparent that the incoming raw water will be subject to treatment in the unit 46b without any softening. On the other hand, if the unit operates on the upflow principle, the water entering the unit 46b is softened water. The unit 46b comprises a container 55b having a closed bottom 69 and a screened inlet opening 70 in the top, so that the water is forced to pass through the bed of water treating material 60b before it can be discharged through slots 57 in the pipe 54 and conducted to the service pipe 45 through the pipe 43 and cap 24. In certain localities the water available is better for drinking purposes if left hard and merely subjected to treatment for removal of odor and/or taste, and under such conditions the water treatment unit should be installed in a downflow softener in the manner illustrated in Fig. 4.

Referring to Fig. 6, the water treatment unit 46c shown comprises a container 55c of perforated or screen material in its outer and inner walls 71 and 72 and filled with a water treating material 60c. The incoming water to be treated, which may be hard water, soft water, or partly softened water, depending upon the mode of installation or upon whether the softener operates on the upflow or downflow principle, as previously indicated, passes through the walls 71 and 72 from all directions and through the material 60c therebetween for treatment, the treated water being then discharged through pipe 43 to the service pipe 45 in the manner previously described.

The unit 46d shown in Fig. 7 is a combination unit made up of two containers 55d and 55e in one. The upper container contains a bed of water treatment material 60d, similar to any of the materials 60—60c, and the lower container 55e contains a suitable filtering material 60e. 73 is a partition between the two materials, and 74 are baffles in the lower container to insure passage of fluid in a zigzag course through all of the filtering material after entering the bottom inlet 75. The filtered water enters slots 76 in the lower end of the pipe 77 and is conducted through the pipe into the upper end of the upper container for passage downwardly through the bed 60d for treatment. The water is discharged through slots 78 in the lower end of the pipe 79, which communicates with the pipe 43 connected with the service pipe 45 through the passage in the cap 24, in the manner previously described. The water in certain localities, especially if taken directly from the supply pipe, in a downflow softener, for example, where it has not been subjected to the filtering action of the bed of water softening material, may require filtering in addition to treatment for odor and/or taste, and in such cases a combination unit of the type just described fills the needs.

Referring to Fig. 8, wherein I have shown a unit of the type 46a of Fig. 3, open at top and bottom for suspension of the unit from the cap 24 on the pipe 43, I have illustrated the container 55a as disposed wholly above the bed 28 but provided with a downwardly extending strainer pipe 80 threaded in the bottom opening of the container. The strainer pipe 80 extends down into the upper portion of the bed 28 and has slots 81 in the lower portion thereof for inlet of water, the lower end of the pipe being closed by a plug 82. This construction will afford substantially the same operation as that of Figs. 1, 2, and 3, although the container 55a is not itself submerged in the upper portion of the bed. The water passed through the container, being taken from a point below the top of the bed will be more or less softened and, depending upon the extent of softening desired, the pipe 80 may be provided of whatever length is necessary. This makes the unit easily adaptable to different requirements in different localities having waters of widely different characteristics.

In Fig. 9 I have shown a fluid conditioning apparatus of the kind covered in my copending application mentioned above, of which this application is a continuation in part. 83 is a strainer suspended on a tubular fitting 84 carried on the cap 24a. The cap closes the open top of the tank and has a single passage 38 therein for conducting raw water from the pipe 32 through the fitting 84 into the head space 41 in the tank. A flap valve 85 is hinged on the side of the fitting 84 and has an aperture 86 therein. The valve falls by gravity to its seat covering the opening in the side of the fitting 84, and when water is delivered to the tank through the pipe 32 the valve 85 unseats easily to admit the water. A check valve 87 prevents flow of the incoming water downwardly into and through the slots of the strainer 83, so that all incoming water passes the valve 85. It is only when the direction of flow is reversed in backwashing that the check valve 87 opens to allow the passage of water upwardly through the fitting 84 from the strainer 83 and out through the pipe 32 to the drain pipe 35. The bulk of the outflow is through the strainer 83, and the strainer serves to retain the mineral of the bed 28 while allowing fine particles of sediment to escape with the outgoing water through the slots. The aperture 86 in the flap valve 85 affords an outlet for suspended particles of sediment, but this aperture, which is much larger than any of the slots in the strainer, will not be apt to allow any particles of mineral to escape, inasmuch as the flap valve is located so high in relation to the top of the bed and the mineral is, of course, much heavier than the suspended sediment particles so that it does not rise far enough to reach the flap valve, and the rate of flow through the aperture 86 is not great enough to entrain the heavier mineral particles, but only great enough to entrain the lighter sediment particles. The strainer 83 forms a support for a water treatment unit of the type 46a, which, as disclosed in Fig. 3, is open at the top and bottom for passage through the bed 60a of water treatment material from the open lower end 66 to the upper end 88 of the container, which is removably secured to the lower end of the strainer 83. A pipe 43a extends from the upper end of the container upwardly through a hole in the cap 24a and is connected with the service pipe 45. This water conditioning unit is therefore completely submerged in the bed of water softening material 28, and, consequently, the water admitted to the unit 46a for passage through the material therein is softened before the supplemental treatment and is likewise filtered before such supplemental treatment by reason of its passage through the bed 28.

Referring now to Fig. 10, I have illustrated a water treatment unit installed in such a way that it is arranged to be cleaned and reconditioned by reverse flow therethrough of brine in the regeneration of the bed of water softening material in the softener. In this figure a water treatment unit 46b of the type shown in Fig. 5 is illustrated, suspended from the cap 24 inside the tank 21 and arranged to deliver filtered or otherwise treated water to the service pipe 45. A valve 92 in the service pipe is closed at the time of regeneration of the softener, and a valve 98 in the pipe 32 is also closed at that time. A valve 36 in the brine pipe 37 is opened as well as a valve 99 in a bypass pipe connection 101 extending from the discharge side of the ejector nozzle 100 to the service pipe 45. The raw water flowing through the ejector nozzle 100 entrains brine from the brine tank 29 through the pipe 37 and the mixture of brine and water is conducted through pipe 101 to the service pipe 45 and flows through the unit 46b in the reverse direction from that of the water in the normal operation of the softener, whereby to cleanse and sterilize the bed 60b in the unit 46b during the brining of the bed 28. After a predetermined amount of brine has been passed through the bed 28 in the softener and the bed 60b in the water treatment unit, the brine valve 36 is closed and raw water is permitted to continue flowing in the same direction through the softener and water treatment unit to rinse out the brine. After a small predetermined amount of rinse water has been passed through the water treatment unit, sufficient for complete rinsing thereof, the valve 99 can be closed and the valves 92 and 98 opened and the rinsing of the softener can be continued until the water discharging to the drain 35 tests soft, inasmuch as it would not be advisable to pass rinse water through the water treatment unit for the full period of rinsing of the softener. As soon as the valve 98 is reopened, the unit 46b is, of course, ready to resume furnishing treated water, even before rinsing of the softener has been completed. With certain water treatment materials the passage of brine therethrough reconditions the material and the unit after such reconditioning is substantially as good as new, and the water treatment unit should, therefore, last as long as the softener.

Referring to Fig. 11, I have shown a softener in which the water treatment unit 46b employed does not contain a bed of any solid water treating material or mineral, but instead is filled with a liquid water treating chemical 60f, the unit being installed in such a way that it acts as a proportional chemical feeder to discharge a small amount of the treatment liquid into the water in proportion to the flow of water through the softener. It will be readily apparent to those skilled in this art that the water in certain localities can best be treated in this way before the water is softened, as, for example, where it is desired to precipitate out certain impurities so that these may be filtered out of the water by the bed 28 through which the water must pass in softening. The unit 46b is suspended from the cap 28 on a pipe 43. Raw water is delivered into the top of the tank through the pipe 32, and a branch pipe connection 102 from the raw water supply pipe 32 conducts water into the unit 46b to expell the liquid chemical therefrom at a rate dependent upon the adjustment of the regulating valve 103 in the pipe 102. During regeneration of the softener, the valve 103 can be closed so that there will be no wasting of the chemical 60f. When all or nearly all of the chemical has been used up, the unit can be refilled from a source of chemical under pressure, or by gravity, through a pipe 104 connected with the pipe 102 by closing valves 98 and 103 and opening a valve 105 in the refill pipe 104 and opening another valve 106 in a vent pipe 107 connected with the raw water supply pipe 32.

The water treatment unit 46c shown in Fig. 12 operates in a similar manner to that illustrated in Fig. 11, and is supported on the end of a strainer 83 in the head space of a tank 21, similarly as the unit 46a in Fig. 9, the strainer being carried on a fitting 84 projecting downwardly from the closure cap 24a. The flap valve 85 on this fitting is the same as the flap valve in Fig. 9 and has the same aperture 86. There is also a check valve 87 in the fitting 84, the same as in Fig. 9. In general, therefore, the operation of this softener is the same as that of Fig. 9, the valve 87 being closed during softening as the incoming raw water from the pipe 32 enters the head space in the tank past the valve 85, which opens freely for inlet of water. The strainer 83 comes into action during backwash when the outgoing water unseats the valve 87 and seats the valve 85, the strainer under these conditions serving to retain the mineral while allowing escape of finer particles of sediment, and the valve 85 permitting escape of sediment through the aperture 86 without danger, however, of any mineral escaping due to the elevation of the valve 85 and the rate of discharge at that elevation. The unit 46c contains a liquid water treatment mineral 60f, and a pipe 102a, which extends downwardly through the cap 24a and enters the top of the container 55c to deliver raw water under pressure to discharge the chemical from the container through another pipe 110, which extends from a point near the bottom of the container up through the top substantially parallel to the strainer 83 to a point near the upper end of the fitting 84 adjacent the flap valve 85, so that the chemical discharged from this pipe 110 will be mixed readily with the incoming raw water entering the tank past the valve 85. The rate of discharge is determined by one or both of valves 103a and 103b in the pipes 102a and 110, respectively. However, any control may be provided to regulate the discharge of chemical in proportion to the water or other fluid passed through the tank 21. It should be understood that although the container 55c is shown disposed inside the tank 21, it may be placed outside the tank and have only its discharge pipe extended into the tank to a point adjacent the flap valve 85. The operation of this embodiment of the invention is manifestly closely similar to that of Fig. 11.

It is believed the foregoing description conveys a good understanding of the objects and advantages of my invention. The appended claims have been drawn with a view to covering all legitimate modifications and adaptations.

I claim:

1. In a fluid conditioning system, the combination of a tank containing fluid conditioning material, said tank having a top opening provided therein communicating with a freeboard space in said tank above the material therein, a removable closure for said top opening, an elongated member suspended from said closure in the freeboard space in said tank, an auxiliary fluid conditioning receptacle that is of a size removable through said opening and contains another kind of fluid conditioning material, said auxiliary receptacle being suspended in said tank on the lower end of said elongated member in the upper portion of the fluid conditioning material in said tank, said auxiliary receptacle communicating with the interior of said tank, whereby said receptacle is subject to substantially the same fluid pressure within and without and fluid flowing from said tank through said auxiliary receptacle is subjected to one conditioning by passage through the fluid conditioning material in the tank and to another conditioning by passage through the material in said auxiliary receptacle, and conduit means communicating with said tank adapted to be connected for conducting fluid to and from the tank, said conduit means including at least one conduit communicating through said closure with said auxiliary receptacle.

2. In a fluid conditioning apparatus, the combination of a tank containing fluid conditioning material, said tank having a top opening provided therein communicating with a freeboard space in said tank above the material therein, a removable closure for said top opening, an auxiliary fluid conditioning receptacle that is of a size removable through said opening and contains another kind of fluid conditioning material, said auxiliary receptacle being attached to said closure and suspended therefrom in said tank and communicating with the interior of said tank whereby said receptacle is subject to substantially the same fluid pressure within and without and fluid flowing from said tank through said auxiliary receptacle is subjected to conditioning by passage through the material in said auxiliary receptacle, and conduit means communicating with said tank adapted to be connected for conducting fluid to and from the tank, said conduit means including at least one conduit communicating through said closure with said auxiliary receptacle.

3. In a fluid conditioning apparatus, the combination of a tank containing fluid conditioning material, said tank having a top opening provided therein communicating with a freeboard space in said tank above the material therein, a removable closure for said top opening, an auxiliary fluid conditioning receptacle that is of a size removable through said opening and contains another kind of fluid conditioning material, said auxiliary receptacle being attached to said closure and suspended therefrom in said tank so that the auxiliary receptacle is at least partially embedded in the upper end portion of the fluid conditioning material in said tank, said auxiliary receptacle communicating with the interior of said tank whereby said receptacle is subject to substantially the same fluid pressure within and without and fluid flowing from said tank through said auxiliary receptacle is subjected to one conditioning by passage through the fluid conditioning material in the tank and to another conditioning by passage through the material in said auxiliary receptacle, and conduit means communicating with said tank adapted to be connected for conducting fluid to and from the tank, said conduit means including at least one conduit communicating through said closure with said auxiliary receptacle.

4. In a fluid conditioning apparatus, the combination of a tank containing fluid conditioning material, said tank having a top opening provided therein communicating with a freeboard space in said tank above the material therein, a removable closure for said top opening, an auxiliary fluid conditioning receptacle that is of a size removable through said opening and contains another kind of fluid conditioning material, said auxiliary receptacle being attached to said closure and suspended therefrom in said tank in the freeboard space, a strainer connected to and extending downwardly from the auxiliary receptacle into the upper end portion of the fluid conditioning material in said tank and affording communication for said auxiliary receptacle with the interior of said tank below the top of the fluid conditioning material in said tank, whereby said receptacle is subject to substantially the same fluid pressure within and without the fluid flowing from said tank through said auxiliary receptacle is subjected to one conditioning by passage through the fluid conditioning material in the tank and to another conditioning by passage through the material in said auxiliary receptacle, and conduit means comprising with said tank adapted to be connected for conducting fluid to and from the tank, said conduit means including at least one conduit communicating through said closure with said auxiliary receptacle.

5. In a fluid conditioning apparatus, the combination of a tank containing fluid conditioning material, said tank having a top opening provided therein communicating with a freeboard space in said tank above the material therein, a removable closure for said top opening, an auxiliary fluid conditioning receptacle that is of a size removable through said opening and contains another kind of fluid conditioning material, said auxiliary receptacle being attached to said closure and suspended therefrom in said tank in the freeboard space and communicating with the interior of said tank, and conduit means communicating with said tank adapted to be connected for conducting fluid to and from the tank, said conduit means including at least one conduit communicating through said closure with said auxiliary receptacle.

CHESTER T. McGILL.

REFERENCES CITED

The following references are of record in the file of this patent:

UNITED STATES PATENTS

| Number | Name | Date |
|---|---|---|
| 1,457,503 | Cross | June 5, 1923 |
| 1,698,890 | McGill | Jan. 15, 1929 |
| 2,304,109 | McGill | Dec. 8, 1942 |
| 355,005 | Deutsch | Dec. 28, 1886 |
| 489,084 | Morgan | Jan. 3, 1893 |
| 628,884 | Deutsch | July 11, 1899 |
| 632,091 | Bommarius | Aug. 29, 1899 |
| 636,356 | Randall | Nov. 7, 1899 |
| 1,719,548 | Hufschmidt | July 2, 1929 |
| 1,694,332 | McGill | Dec. 4, 1928 |
| 522,819 | Ball et al. | July 10, 1894 |
| 1,483,858 | Hepburn | Feb. 12, 1924 |
| 1,541,921 | Caps | June 16, 1925 |
| 1,685,816 | Kenney | Oct. 2, 1928 |
| 1,697,835 | McGill | Jan. 1, 1929 |
| 1,703,451 | McGill | Feb. 26, 1929 |
| 1,929,405 | Bilde | Oct. 10, 1933 |
| 1,704,051 | McGill | Mar. 5, 1929 |
| 2,304,109 | McGill | Dec. 8, 1942 |